United States Patent
Li et al.

(10) Patent No.: US 11,216,862 B2
(45) Date of Patent: Jan. 4, 2022

(54) SMART SHOPPING CART, SERVER, SMART SHOPPING SYSTEM AND METHOD

(71) Applicant: BOE TECHNOLOGY GROUP CO., LTD., Beijing (CN)

(72) Inventors: Yanfu Li, Beijing (CN); Lihua Geng, Beijing (CN); Xitong Ma, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 35 days.

(21) Appl. No.: 16/420,943

(22) Filed: May 23, 2019

(65) Prior Publication Data
US 2020/0027148 A1  Jan. 23, 2020

(30) Foreign Application Priority Data
Jul. 23, 2018 (CN) .......................... 201810811314.8

(51) Int. Cl.
*G06Q 30/06* (2012.01)
*B62B 5/00* (2006.01)
(Continued)

(52) U.S. Cl.
CPC ....... *G06Q 30/0631* (2013.01); *B62B 5/0096* (2013.01); *G06K 7/1408* (2013.01); *G06K 9/00288* (2013.01); *G06Q 30/0627* (2013.01)

(58) Field of Classification Search
CPC .......... G06Q 30/0627; G06Q 30/0631; G06Q 20/208; G06Q 30/0601; G06Q 30/0255;
(Continued)

(56) References Cited

U.S. PATENT DOCUMENTS 10,147,129 B1 * 12/2018 Shang ................ G06Q 30/0633
10,671,856 B1 *  6/2020 Ren ......................... G06F 16/50
(Continued)

FOREIGN PATENT DOCUMENTS

| CN | 107507072 A | 12/2017 |
| CN | 107590655 A |  1/2018 |
| CN | 107808469 A |  3/2018 |

OTHER PUBLICATIONS

Myint Myat Moe, "Automated Billing System using Smart Shopping Cart", "Electronics & Communication Engineering", vol. 3 | Issue 4, p. 1669-1673, May-Jun. 2019. (Year: 2019).*
(Continued)

*Primary Examiner* — Yogesh C Garg
(74) *Attorney, Agent, or Firm* — Thomas | Horstemeyer, LLP

(57) ABSTRACT

The present disclosure relates to a smart shopping cart, a server, a smart shopping system, and a method. The smart shopping cart includes a shopping cart body, an image capturing unit, and a display unit. The image capturing unit is configured to capture an image of a user face, such that the server identifies the image of the user face to obtain user identity information, query a user consumption history database based on the user identity information to obtain user consumption history data, generate user consumption interest data according to the user consumption history data, and generate product push information according to the user consumption interest data. The display unit is configured to receive and display the product push information.

18 Claims, 6 Drawing Sheets

(51) Int. Cl.
  *G06K 7/14* (2006.01)
  *G06K 9/00* (2006.01)
(58) Field of Classification Search
  CPC .. G06Q 30/0251; G06Q 30/80; B62B 5/0096;
     B62B 3/1408; B62B 3/1416; B62B
     3/1424; G06K 7/1408; G06K 9/00288;
     G06K 9/00771; G16H 20/60
  USPC ............................................... 705/26.1–27.2
  See application file for complete search history.

(56) References Cited

U.S. PATENT DOCUMENTS

| | | | | |
|---|---|---|---|---|
| 2001/0054014 | A1* | 12/2001 | Noda | G06Q 10/087 705/26.1 |
| 2003/0165193 | A1* | 9/2003 | Chen | G06T 9/004 375/240.08 |
| 2010/0169343 | A1* | 7/2010 | Kenedy | G06F 16/9535 707/758 |
| 2012/0226556 | A1* | 9/2012 | Itagaki | G07G 1/0081 705/14.64 |
| 2012/0284132 | A1* | 11/2012 | Kim | G07G 1/0081 705/20 |
| 2014/0214577 | A1* | 7/2014 | Acker, Jr. | G01G 19/12 705/23 |
| 2015/0073925 | A1* | 3/2015 | Renfroe | G06Q 50/12 705/15 |
| 2015/0088642 | A1* | 3/2015 | Mathew | G06Q 30/0631 705/14.51 |
| 2015/0120475 | A1* | 4/2015 | Pedley | G06Q 20/3276 705/20 |
| 2016/0140644 | A1* | 5/2016 | Babu | G06Q 30/0631 705/26.7 |
| 2016/0162971 | A1* | 6/2016 | Peterson | G06Q 30/0639 705/26.63 |
| 2017/0228364 | A1* | 8/2017 | Byron | G06F 40/253 |
| 2018/0183737 | A1* | 6/2018 | Subbarayan | H04L 51/32 |
| 2018/0204111 | A1* | 7/2018 | Zadeh | G06K 9/3233 |
| 2018/0285465 | A1* | 10/2018 | Schaffernoth | G06F 16/29 |
| 2019/0118844 | A1* | 4/2019 | Li | G07G 1/0081 |
| 2019/0279185 | A1* | 9/2019 | Cheng | B62B 3/1424 |
| 2019/0337549 | A1* | 11/2019 | Lobo | G06K 9/00288 |

OTHER PUBLICATIONS

Gurumurthy, Sasikumar. "Design of an Intelligent Shopping Basket Using IoT." ResearchGate, Jan. 2017, www.researchgate.net/publication/317932719_DESIGN_OF_AN_INTELLIGENT_SHOPPING_BASKET_USING_IoT.*

First Office Action for CN Patent Application No. 201810811314.8 dated Jul. 2, 2021.

* cited by examiner

| Recommended Products | | | | |
|---|---|---|---|---|
| Product Name | Unit | Content/Weight | Price | Promoted Information |
| Potato Chips | Box | 100g | 4.5 Yuan | 0.5 Yuan Off |
| Mineral Water | Bottle | 500ml | 1.5 Yuan | Two - For - One Offer |
| Beer | Pack | 330ml×24 | 45 Yuan | NA |
| XXX | X | X | X | X |
| XXX | X | X | X | X |

| | Products in Shopping Cart | | | |
|---|---|---|---|---|
| Sequence Number | Product Name | Unit | Content/Weight | Price |
| (1) | Beef | Box | 1000g | X |
| (2) | Olive | Box | 50g | X |
| (3) | Juice | Bottle | 330ml | X |
| (4) | White Liquor | Bottle | 500ml | X |

FIG. 4

Dear Customer,

The beef and the Olive you put into the shopping cart cannot be ate together, and the Juice and the white liquor cannot be drank together.

The beef you put into the shopping cart are more nutritious and anty-aging when eaten together with taro.

The information is for your reference and wish you happy shopping!

FIG. 5

SMART SHOPPING CART, SERVER, SMART SHOPPING SYSTEM AND METHOD

CROSS REFERENCE TO RELATED APPLICATIONS

The present application is based upon, and claims the benefit of and priority to Chinese Patent Application No. 201810811314.8, filed on Jul. 23, 2018, the entire disclosure of which is hereby incorporated by reference as a part of the present application.

TECHNICAL FIELD

The present disclosure relates to the field of intelligent control technology and, more particularly, to a smart shopping cart, a server, and a smart shopping system.

BACKGROUND

With the rapid development of science and technology, intelligent control technology represented by artificial intelligence has reached all fields of human life. Among them, smart retail is an important branch of IOT (Internet of Things) and artificial intelligence, and a sophisticated smart shopping system will become an integral part of future shopping model.

Currently, the main shopping manner for consumers is to shop in a large shopping mall or supermarket. In particular, supermarkets have a wide range of products and options, and consumers usually purchase food and daily necessities in supermarkets. Supermarkets usually have shopping carts that are convenient for customers to purchase goods.

It should be noted that the information disclosed in the Background section above is only for enhancement of understanding of the background of the present disclosure, and thus may include information that does not constitute prior art known to those of ordinary skill in the art.

SUMMARY

It is an objective of the present disclosure to provide a smart shopping cart, a server, a smart shopping system, and a smart shopping method.

In order to achieve the above objective, the present disclosure provides the following technical solutions.

A first aspect of the present disclosure provides a smart shopping cart system, including a shopping cart body and a server, wherein the smart shopping cart includes a display unit;

the smart shopping cart is configured to collect user information. The server identifies user identity information from the user information, queries a user identity consumption history database based on the user information to obtain user consumption history data, generates user consumption interest data according to the user consumption history data, and generates product push information according to the user consumption interest data; and the display unit is configured to receive and display the product push information.

Optionally, the smart shopping cart system further includes an image capturing unit, wherein the smart shopping cart is configured to collect user information by capturing an image of a user face with the image capturing unit.

Optionally, the display unit is a touch display unit, and the smart shopping cart is configured to collect user information by obtaining the user information input by a user through the touch display unit.

Optionally, the image capturing unit is configured to capture an image of a product placed by a user into the shopping cart body, such that the server identifies the product image to obtain food information of food in the product, queries edible collocation information database according to the food information to obtain edible collocation information; and the display unit is configured to receive and display the edible collocation information.

Optionally, the smart shopping cart further includes a scan code unit;

wherein the scan code unit is configured to scan a barcode of the product placed by the user into the shopping cart body, such that the server obtains the food information of food in the product according to the product barcode, queries the edible collocation information database according to the food information to obtain the food collocation information.

A second aspect of the present disclosure provides a server, wherein the server is configured to receive user information of a user, identify user identity information from the user information, query a user consumption history database based on the user identity information to obtain user consumption history data, generate user consumption interest data according to the user consumption history data, generate product push information according to the user consumption interest data, and send the product push information to the user.

Optionally, the server is configured to receive an image of the user face, and identify the image of the user face to obtain user identity information.

Optionally, the server is configured to receive login information input by the user, and obtain the user identity information according to the login information.

Optionally, the server is configured to receive the product image s, identify the product image to obtain food information of food in the product, query edible collocation information database according to the food information to obtain edible collocation information, and send the edible collocation information to the user.

Optionally, the server is configured to receive the barcode of the product, obtain the food information of food in the product according to the product barcode, query the edible collocation information database according to the food information to obtain the food collocation information, and send the edible collocation information to the user.

A third aspect of the present disclosure provides a smart shopping method using the system according to the first aspect, including:

the smart shopping cart capturing an image of a user face;

the server identifying the image of the user face to obtain user identity information, querying a user consumption history database based on the user identity information to obtain user consumption history data, generating user consumption interest data according to the user consumption history data, and generating product push information according to the user consumption interest data; and the smart shopping chart displaying the product push information.

It should be understood that both the foregoing general description and the following detailed description are exemplary and explanatory only and are not restrictive of the disclosure.

BRIEF DESCRIPTION OF THE DRAWINGS

The specific embodiments of the present disclosure are further described in detail below with reference to the accompanying drawings;

FIG. 4 is a schematic diagram of a display unit of a smart shopping cart displaying product information according to an embodiment of the present disclosure.

FIG. 5 is a schematic diagram of a display unit of a smart shopping cart displaying edible collocation information according to an embodiment of the present disclosure.

DETAILED DESCRIPTION

Figures 1, 2:
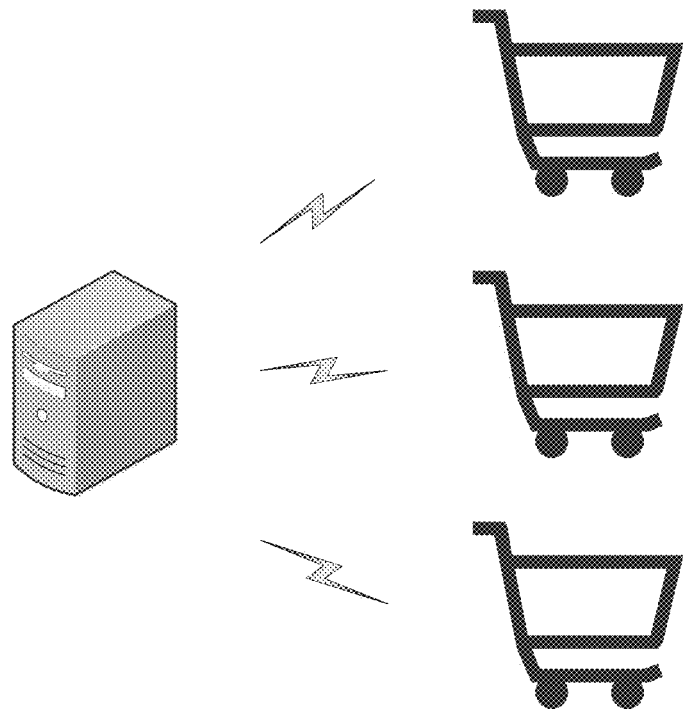
FIG. 1 is a schematic diagram of a smart shopping system according to an embodiment of the present disclosure.
FIG. 2 is a schematic diagram of a display unit of a smart shopping cart displaying product push information according to an embodiment of the present disclosure.

In order to explain the present disclosure more clearly, the present disclosure will be further described in conjunction with the preferred embodiments and the accompanying drawings. Similar components in the drawings are denoted by the same reference numerals. It should be understood by those skilled in the art that the following detailed description is intended to be illustrative and not restrictive.

In addition, the drawings are merely schematic and are not necessarily drawn to scale. The same reference numerals in the drawings denote the same or similar parts, and the repeated description thereof will be omitted. Some of the block diagrams shown in the figures are functional entities and do not necessarily have to correspond to physically or logically separate entities. These functional entities may be implemented in software, or implemented in one or more hardware modules or integrated circuits, or implemented in different networks and/or processor devices and/or microcontroller devices.

As shown in FIG. 1, an embodiment of the present disclosure provides a smart shopping system including a plurality of smart shopping carts and a computing device, such as a server. The smart shopping cart includes a shopping cart body and an interaction system, and the interaction system includes an image capturing unit and a display unit.

The image capturing unit is configured to capture an image of a user face and send it to the server.

The server is configured to receive the image of a user face, identify the image of the user face to obtain user identity information, query a user consumption history database based on the user identity information to obtain user consumption history data, generate user consumption interest data according to the user consumption history data, generate product push information according to the user consumption interest data, and send the product push information to the display unit, wherein the user consumption history database can be set in the server.

The display unit is configured to receive and display the product push information.

The smart shopping system provided by the embodiment can automatically capture an image of the user face through the image capturing unit in the interaction system of the smart shopping cart, analyze and process the image of the user face captured by the image capturing unit, and generate a targeted and personalized product push information through the server, and display the product push information to the user in a targeted and personalized manner through the display unit in the interaction system of the smart shopping cart. It can fully utilize the smart shopping cart to facilitate one-to-one information interaction with the customer.

As shown in FIG. 2, the product push information displayed by the display unit in the embodiment may include the name, price, promotion information, and the like of the recommended product. For example, the process of generating the product push information is as follows. After the server identifies the image of the user face and identifies the user through matching, products the user has purchased are sorted in an order from a high purchase frequency by the user to a low purchase frequency by the user according to the user consumption history data, products with relatively high purchase frequency by the user and/or associated products of the product are taken as recommended products to be listed in the product push information to be pushed, and stepwise quotes for the recommended products are presented in promotion information in the product push information according to the purchase frequencies of a certain type of products by the user. The higher the purchase frequency of a certain type of products is, the higher the discount given to the user of the products and/or the associated products of the products will be. In addition, the product push information may also include information such as the area where the recommended product is located, the position of the container, and the like, which is convenient for the user to purchase. With such targeted and personalized product push method for different users and for different products, information can be accurately pushed based on a user's purchase intention and interests, and the transaction success rate can be improved.

In the embodiment, the shopping cart body includes conventional components such as a frame, a wheel, and a handlebar. The above components are the same as those in the related art, which will not be described herein.

According to the embodiment, the user's face image is captured by the image capturing unit, thereby obtaining user information related to the user, and the user information is used to identify the user's identity information. However, it should be understood by those skilled in the art that the manner in which user information is acquired is not limited to photographing the user's face image using the image capturing unit, and other techniques for obtaining user information known in the art or developed in the future may be applied to the present disclosure. For example, user information can be obtained by any means such as voice recognition, scan code, RFID tag, etc., to determine the identity of the user.

In some optional implementations of the embodiment, the display unit is a touch display unit, and the touch display unit is configured to obtain login information input by the user and send the login information to the server.

Then, the server is configured to receive the login information, obtain the user identity information according to the login information, query the user consumption history database based on the user identity information to obtain the user consumption history data, generate the user consumption interest data according to the user consumption history data, and generate the product push information according to the user consumption interest data.

In this implementation, for users, such as member users, the login information can be input through the touch display unit, and the server can generate targeted and personalized product push information by analyzing and processing the login information. In order to realize the user inputting the login information, in addition to providing the display unit as the touch display unit, an input device, such as a keyboard may additionally be provided.

In some optional implementations of the embodiment, the image capturing unit is also configured to capture an image of the product placed by the user into the shopping cart body and send it to the server.

Then, the server is configured to receive the product image, identify the product image to obtain food information of food in the product, and query edible collocation information database according to the food information to obtain edible collocation information, wherein the edible collocation information database can be provided in the server.

The display unit is configured to receive and display the edible collocation information.

In this implementation, the image capturing unit can automatically capture the product placed by the user in the shopping cart body, and the server can identify the product image, identify the food and the food information of the food through matching, and query the edible collocation information database according to the food information to obtain the food collocation information for the food placed in the shopping cart body. The display unit can display the edible collocation information to the user to remind the user of healthy diet behavior and improve the user experience. The edible collocation information may include: what kind of food is more nutritious with the food placed by the user in the shopping cart body, and what kind of food should not be eaten together with the food placed by the user in the shopping cart body, etc.

In some optional implementations of the embodiment, the smart shopping cart further includes a scan code unit.

The scan code unit is configured to scan a machine-readable identifier, such as a barcode, of the product placed by the user into the shopping cart body, and send it to the server.

The server is configure receive the barcode of the product, obtain the food information of food in the product according to the product barcode, query the edible collocation information database according to the food information to obtain the food collocation information.

In this implementation, after the user places the food into the shopping cart body, if the display unit does not display the edible collocation information because the image capturing unit fails to capture the image of the product placed by the user into the shopping cart body, and the server fails to identify the product, etc., the user can scan the product with the scan code unit by himself, such that the display unit displays the edible matching information for the food in the product. It can also remind the user of the healthy diet behavior and improve the user experience.

In order to enable the image capturing unit can capture both of the image of the user face and the image of the product placed by the user into the shopping cart body, the image capturing unit can be a 360° camera, or can be provided with a rotating mechanism controlled by the main control unit, where the rotating mechanism cooperates with the camera. The rotating mechanism may include a motor, a transmission member, a fixing member for fixing the camera, and the like. The motor drives the camera to rotate by the transmission member and the fixing member under the control of the main control unit. On the other hand, the camera can be an RGBD camera, and the RGBD camera can capture an image of the product placed by the user into the shopping cart body with color information and depth information.

Figure 3:
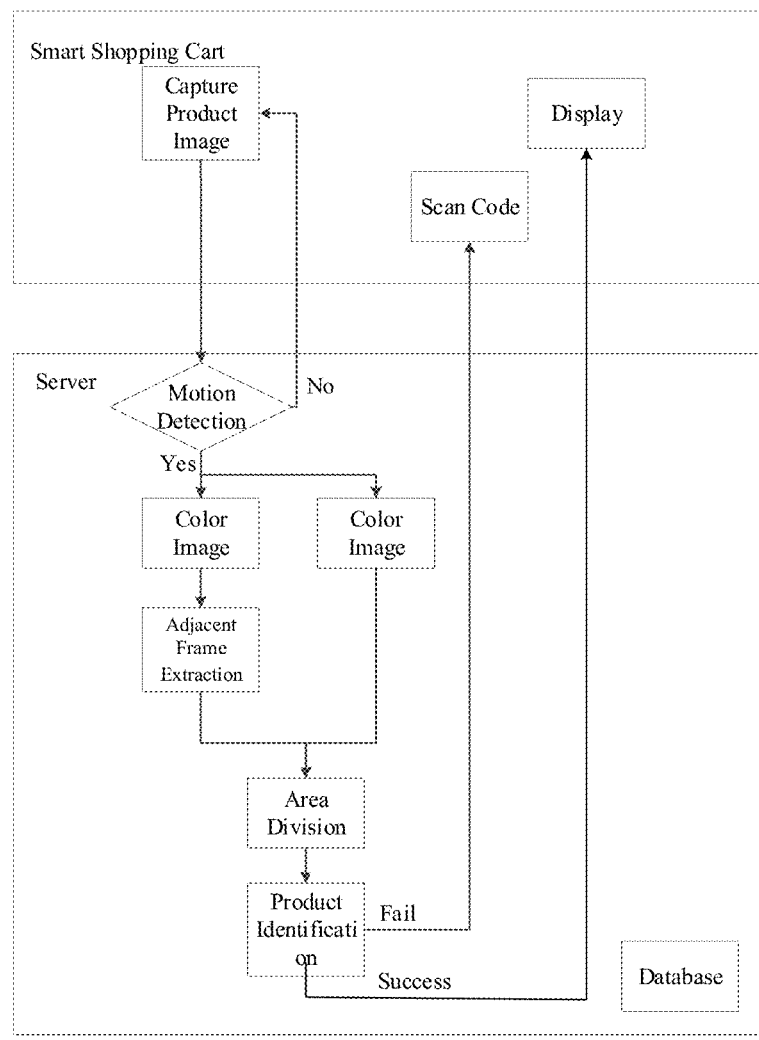
FIG. 3 is a flowchart of a smart shopping system capturing an image of a product and displaying edible collocation information according to an embodiment of the present disclosure.

As shown in FIG. 3, when an RGBD camera is used, the smart shopping system provided by the embodiment of the present disclosure captures the product image and displays the edible collocation information as follows.

Figure 6:
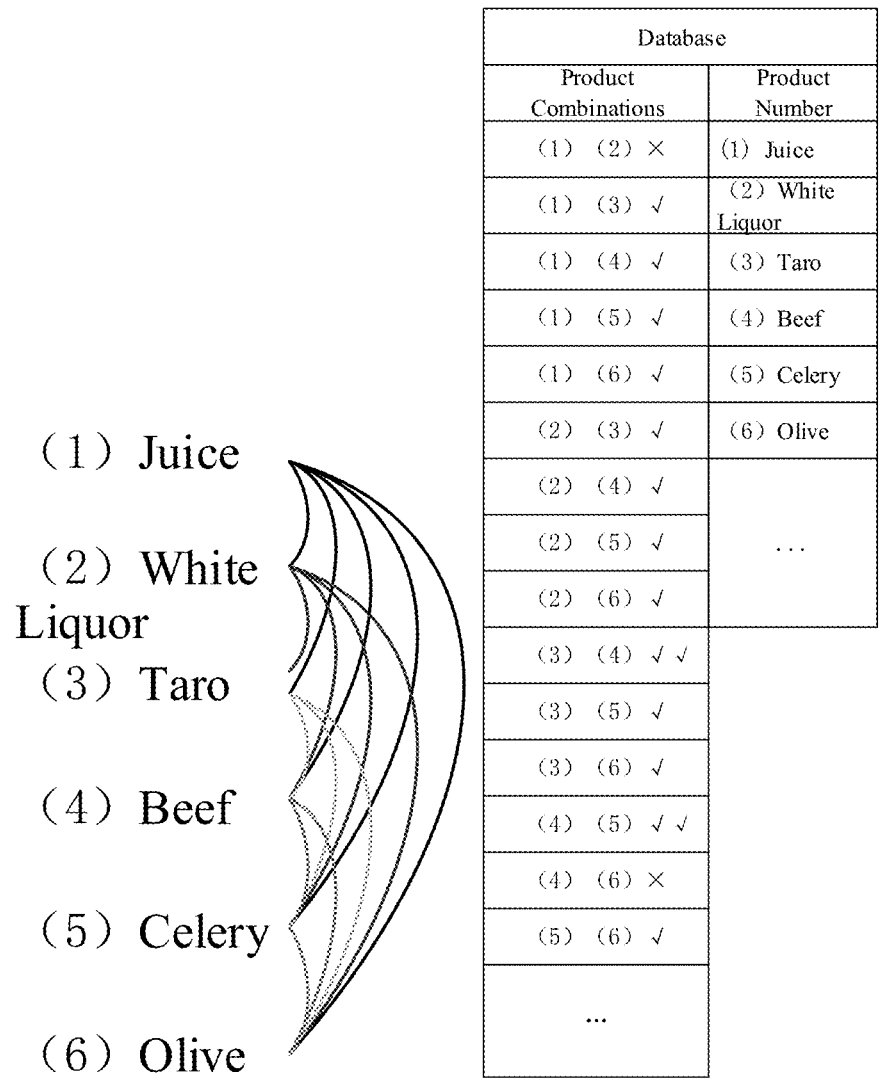
FIG. 6 is a schematic diagram showing a product number and a product combination mark.

The image capturing unit captures an image of the product placed by the user into the shopping cart body and sends it to the server. Thereafter, the server identifies the action of the user placing the product in the shopping cart body, and through the motion identification, based on the principle of motion detection, by determining a proportion of pixels that have large changes in gray values between adjacent frame images, it can determine there is a putting action. When the presence of the putting action is detected, the image captured by the camera is locked. Thereafter, the server compares the adjacent frame images, determines the changed region in the image based on the depth information, and cuts it out as the candidate product region. Thereafter, the server can use the product identification algorithm to identify the product type placed by the user into the shopping cart body and obtain the food information of food in the product according to a product identification model obtained by training the samples of various types of products in advance. If the identification is successful, the display unit displays the product placed by the user into the shopping cart body, and displays information of the product placed by the user into the shopping cart body, as shown in FIG. 4. If the identification fails, the display screen may prompt the user to use the scan code unit to scan the code by himself to identify the product. After the user confirms the product placed in the shopping cart body through an input device such as a touch display screen, the server transmits the edible collocation information as shown in FIG. 5 to the display unit and displays it through the display unit. The process of the server querying the edible collocation information database according to the food information to obtain the food collocation information of the food placed by the user in the shopping cart body is specifically as follows. First, all of the products in the supermarket are numbered, as shown in FIG. 6. Assuming that the supermarket has a total of six kinds of products, the products are numbered in a sequence, and the products and the numbers are in one-to-one correspondence. Then, the products are combined in pairs, and there are 15 kinds of combinations. The combinations are stored in a database, such as product (1) juice and product (2) white liquor are not suitable when drank together and the combination is marked with one symbol x, product (3) taro and product (4) beef are good for health when eaten together and the combination is marked with two symbols √. In this manner, a database of the combinations of the products is formed. After obtaining the food information of food in the products placed by the user in the shopping cart body, the server starts to combine the foods in pairs, and the combined list will be searched for in the database, and the corresponding product combinations are retrieved as the symbol x, the symbol √ or symbols √√. The edible collocation information in the form of the corresponding symbol and text description will be displayed on the display unit, thereby achieving the purpose of reminding the user.

In some optional implementations of the embodiment, the server updates the user consumption history data of the corresponding user identity information in the user consumption history database according to the product image or the product barcode.

In this implementation, the server can update the user consumption history data of the user in the user consumption history database based on the product image or the product barcode currently placed by the user in the shopping cart body. It can make the data in the user consumption history database more accurate.

Figure 7:
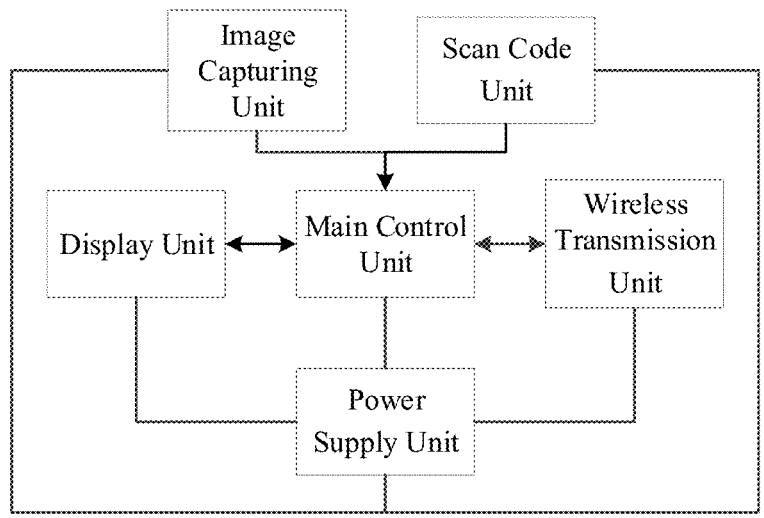
FIG. 7 is a block diagram showing an interaction system of a smart shopping cart according to an embodiment of the present disclosure.

As shown in FIG. 7, in some optional implementations of the embodiment, the interaction system may further include a main control unit, a wireless transmission unit, and a power supply unit.

The main control unit is configured to receive an image of a user face, an image of a product, and a product barcode scanned by the scan code unit, and send the image of the user face, the image of the product, and the product barcode to the server.

The main control unit is further configured to receive the product push information and the edible collocation information from the server through the wireless transmission unit and forward the product push information and the edible collocation information to the display unit.

The power supply unit is configured to supply power to the image capturing unit, the display unit, the main control unit, the scan code unit, and the wireless transmission unit, wherein the power supply unit may include a battery.

In this implementation, the main control unit is provided as the core control unit of the interaction system, and can implement a function of data pre-processing of the image of the user face taken by the image capturing unit. The wireless transmission method can facilitate data transmission between the server and the smart shopping cart moving randomly.

In some optional implementations of the embodiment, the server is a cloud server, and the cloud server has the advantages of being simple, efficient, secure, and flexible in processing power.

In some optional implementations of the embodiment, the server includes:

a user identification unit configured to identify an image of a user face, to obtain user identity information;

a user consumption history data query unit configured to query the user consumption history database based on the user identity information to obtain user consumption history data;

a user consumption interest data generation unit configured to generate user consumption interest data according to the user consumption history data; and a product push information generation unit configured to generate the product push information based on the user consumption interest data.

Figure 8:
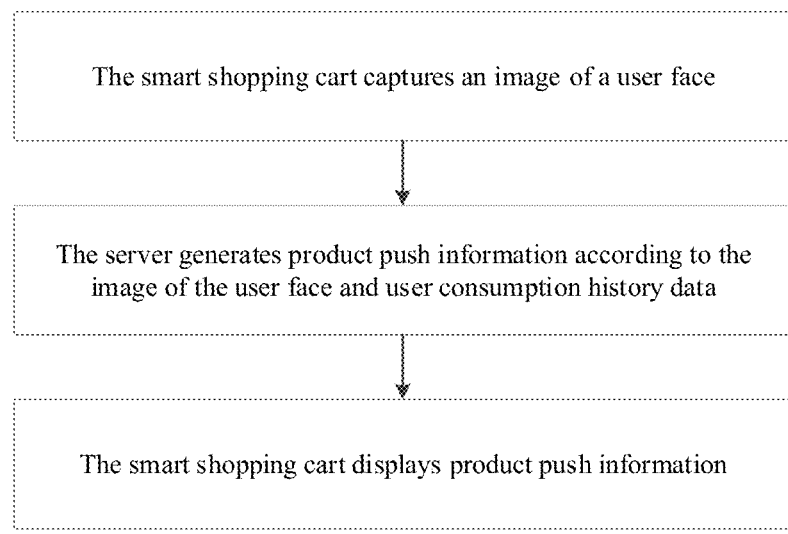
FIG. 8 is a flowchart of a smart shopping method according to an embodiment of the present disclosure.

As shown in FIG. 8, another embodiment of the present disclosure provides a smart shopping method using the above smart shopping system, including the following steps.

The smart shopping cart captures an image of a user face.

The server generates product push information according to the image of the user face and user consumption history data. Specifically, the server identifies the image of the user face to obtain user identity information, queries user consumption history database based on the user identity information to obtain user consumption history data, generates user consumption interest data according to the user consumption history data, and generates product push information according to the user consumption interest data.

The smart shopping cart displays product push information.

The smart shopping method provided by the embodiment can automatically capture an image of the user face through the smart shopping cart, analyze and process the image of the user face and generate a targeted and personalized product push information through the server, and display the product push information to the user in a targeted and personalized manner through the smart shopping cart. It can fully utilize the smart shopping cart to facilitate one-to-one information interaction with the customer.

It should be noted that the smart shopping method provided in the embodiment is similar to the smart shopping system in principle and the working process. For details, reference may be made to the description above, which will not be repeated herein.

Figure 9:
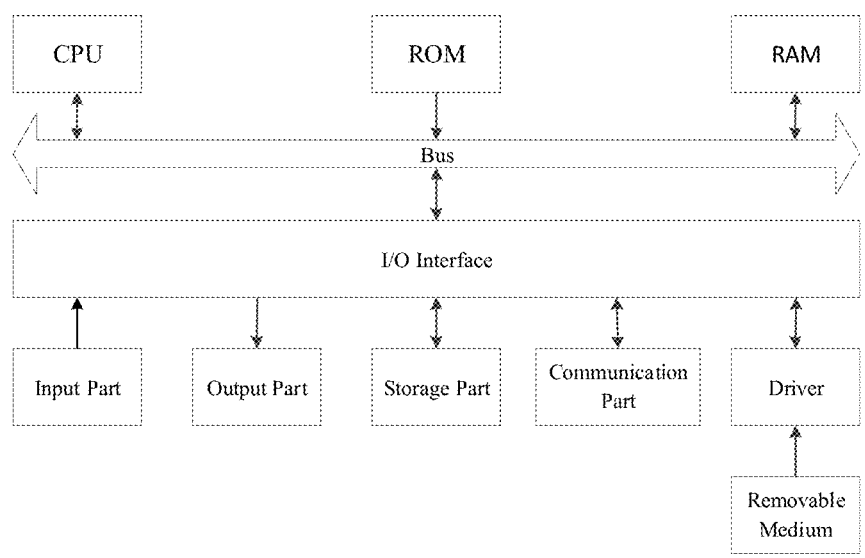
FIG. 9 is a schematic structural diagram of a server according to an embodiment of the present disclosure.

As shown in FIG. 9, a computer system suitable for implementing the above-described server includes a central processing unit (CPU) which can perform various appropriate actions and processing according to a program stored in a read only memory (ROM) or a program loaded from a storage portion into a random access memory (RAM). In the RAM, various programs and data required for the operation of the computer system are also stored. The CPU, the ROM, and the RAM are connected by a bus. An input/output (I/O) interface is also connected to the bus.

The following components are connected to the I/O interface: an input part including a keyboard, a mouse, etc.; an output part including a liquid crystal display (LCD) or the like, a speaker, etc.; a storage part including a hard disk or the like; and a communication part including a network interface card, such as a local area network (LAN) card, a modem, etc. The communication part performs communication processing via a network, such as the Internet. A driver is also connected to the I/O interface as desired. A removable medium such as a magnetic disk, an optical disk, a magneto-optical disk, a semiconductor memory or the like is mounted on the driver as desired such that a computer program read therefrom is installed into the storage portion as desired.

In particular, according to the present embodiment, the process described in the above flowchart can be implemented as a computer software program. For example, the present embodiment includes a computer program product including a computer program tangibly embodied on a computer readable medium. The computer program includes program codes for executing the method illustrated in the flowchart. In such an embodiment, the computer program can be downloaded and installed from the network via the communication part, and/or installed from a removable medium. The flowchart and schematic diagrams in the drawings illustrate the architecture, functionality, and operation of possible implementations of the system, method, and computer program product of the embodiments of the present disclosure. In this regard, each block in the flowchart or diagram may represent a module, a program segment, or a portion of code that includes one or more of executable instructions for implementing specified logic functions. It should also be noted that in some alternative implementations, the functions noted in the blocks may also occur in a different order than that illustrated in the drawings. For example, two successively represented blocks may in fact be executed substantially in parallel, and they may sometimes be executed in the reverse order, depending upon the functionality involved. It is also noted that each block of the schematic and/or flow diagrams, as well as combinations of blocks in the schematic and/or flowcharts, can be implemented in a dedicated hardware-based system that performs the specified functions or operations. Alternatively, it can be implemented by a combination of dedicated hardware and computer instructions.

The units involved in the server described in the embodiment may be implemented by software or by hardware. The described unit may also be provided in the processor. For example, as a processor package user identification unit, a user consumption history data query unit, a user consumption interest data generation unit, and a product push information generation unit. The names of these units do not in any way constitute a limitation on the unit itself. For example, the user identification unit can also be described as a "user identity information matching unit."

In another aspect, an embodiment further provides a non-volatile computer storage medium. The non-volatile computer storage medium may be a non-volatile computer storage medium included in the above-described device in the above embodiments, or may be a non-volatile computer storage medium that is separately provided and not incorporated in the terminal. The non-volatile computer storage medium stores one or more programs. When the one or more programs are executed by a device, the device is configured to: obtain user identity information according to the login information, and query the user consumption history database based on the user identity information to obtain user consumption history data, generates user consumption interest data according to the user consumption history data, and generates product push information according to the user consumption interest data.

In the description of the present disclosure, it is to be noted that the orientation or positional relationship of the terms "upper", "lower" and the like is based on the orientation or positional relationship shown in the drawings, and is merely for convenience of description of the present disclosure and simplified description, rather than indicating or implying that the device or component referred to must have the particular orientation, or constructed and operated in the particular orientation. Therefore, it is not to be construed as limiting the present disclosure. Unless specifically stated and limited, the terms "mounted," "connected with" and "connected to" are used in a broad sense, and may be, for example, a fixed connection, a detachable connection, or an integral connection; it may be a mechanical connection or an electrical connection; it may be directly connected, or connected indirectly through an intermediate medium, and it can be an internal connection of two components. For those skilled in the art, the specific meanings of the above terms in the present disclosure can be understood on a case-by-case basis.

It should also be noted that in the description of the present disclosure, relational terms such as first and second, etc. are used merely to distinguish one entity or operation from another entity or operation, and do not necessarily require or imply that there is any such actual relationship or order between the entities or operations. Furthermore, the term "including" or "comprising" or any other variations thereof is intended to encompass a non-exclusive inclusion, such that a process, a method, an article, or a device that comprises a plurality of elements includes not only those elements but also other elements, or elements that are inherent to such a process, a method, an article, or a device. An element that is defined by the phrase "comprising a . . . " does not exclude the presence of additional equivalent elements in the process, the method, the article, or the device that comprises the element.

It is apparent that the above-described embodiments of the present disclosure are merely illustrative of the present disclosure and are not intended to limit the embodiments of the present disclosure. Other variations and modifications of the various forms may be made by those skilled in the art based on the above description, and all embodiments are not exhaustive. Obvious changes or variations that are derived from the technical solutions of the present disclosure are still within the protection scope of the present disclosure.

What is claimed is:

1. A smart shopping cart system, comprising:
a smart shopping cart comprising a shopping cart body, a server, and a display screen, wherein:
the smart shopping cart is configured to collect user information, transmit the user information over a network to the server, and cause at least one user interface to be shown in the display screen;
the server is configured to receive the user information, identify user identity information from the user information, query a user consumption history database based on the user identity information to obtain user consumption history data, generate user consumption interest data according to the user consumption history data, generate product push information according to the user consumption interest data, and send the product push information to the display screen;
the smart shopping cart further comprises at least one of a camera configured to capture an image of a product placed into the shopping cart body and transmit the image of the product to the server;
wherein the server is further configured to:
receive the image of the product and obtain food information of the product based on the image;
combine foods placed in the shopping cart body in pairs, and query, for each food combination pair, an edible collocation information database according to the food information to obtain edible collocation information by: querying the edible collocation information database to identify that the food combination pair has a good health characteristic when eaten together; or querying the edible collocation information database to identify that the food combination pair should not be eaten together; and
cause the edible collocation information to be presented in the at least one user interface shown in the display screen, the edible collocation information comprising the food that is more nutritious than the product, or the food that should not be eaten together with the product; and
the display screen is configured to transition between the at least one user interface comprising the product push information and the at least one user interface comprising the edible collocation information; and
the server is further configured to, in response to receipt of the image of the product, identify a placement of the product in the shopping cart body through motion identification and detection, wherein the motion identification and detection comprises determining that a proportion of pixels have changes in gray values between adjacent frame images that exceed a threshold size.

2. The smart shopping cart system according to claim 1, wherein the smart shopping cart is further configured to collect the user information by capturing a facial image with the camera.

3. The smart shopping cart system according to claim 1, wherein the display screen is a touch screen, and the smart shopping cart is configured to collect the user information by obtaining the user information input through the touch screen.

4. A smart shopping method, comprising:
providing the smart shopping cart system according to claim 1;
capturing, by the smart shopping cart, an image of a user face;
performing, in the server:
   identifying the image of the user face to obtain the user identity information;
   querying the user consumption history database based on the user identity information to obtain the user consumption history data;
   generating the user consumption interest data according to the user consumption history data; and
   generating the product push information according to the user consumption interest data; and
   displaying, by the smart shopping cart, the product push information in the at least one user interface.

5. The smart shopping cart system according to claim 1, wherein the server is further configured to, in response to the placement of the product in the shopping cart body:
compare adjacent frame images captured by and received from the camera;
determine a changed region in the image based on depth information;
extract the changed region as a candidate product region;
execute a product identification model on the candidate product region as extracted
to identify a type of the product placed into the shopping cart body; and
obtain the food information of the product according to the product identification
model, wherein the product identification model is pre-trained using samples of various types of products.

6. The smart shopping cart system according to claim 5, wherein the server is further configured to, in response to the type of the product being successfully identified, cause the at least one user interface shown in the display screen to display the product placed into the shopping cart body, the at least one user interface comprising product information associated with the product.

7. The smart shopping cart system according to claim 1, wherein the edible collocation information database comprises a plurality of products and a unique identifier associated with each of the plurality of products, the edible collocation information database further comprising a plurality of combinations of the products indicating whether or not a first subject of the products should be eaten with a second subset of the products.

8. A system, comprising:
at least one computing device having at least one hardware processor, an input/output (I/O) interface, and a memory storing a user consumption history database and an edible collocation information database thereon;
program instructions stored in the memory that, when executed by the at least one hardware processor, direct the at least one computing device to:
   receive, by the I/O interface, user information associated with a user of a smart shopping cart;
   identify, by the at least one hardware processor, user identity information from the user information;
   access, by the at least one hardware processor via that I/O interface, the user consumption history database to query the user consumption history database based on the user identity information to obtain user consumption history data;
   generate, by the at least one hardware processor, user consumption interest data according to user consumption history data;
   generate, by the at least one hardware processor, a first user interface for display of product push information according to the user consumption interest data;
   send, by the I/O interface, the first user interface comprising the product push information to the smart shopping cart for display on a display screen;
   receive, by the I/O interface, an image of a product;
   identify, by the I/O interface, the image to obtain food information in the product;
   combine foods placed in the shopping cart body in pairs, and access, by the at least one hardware processor via the I/O interface, the edible collocation information database to query, for each food combination pair, the edible collocation information database according to the food information to obtain edible collocation information by: querying the edible collocation information database to identify that the food combination pair has a good health characteristic when eaten together; or querying the edible collocation information database to identify that the food combination pair should not be eaten together;
   generate, by the at least one hardware processor, a second user interface comprising the edible collocation information, the edible collocation information comprising the food that is more nutritious than the product, or the food that should not be eaten together with the product;
   send, by the I/O interface, the second user interface comprising the edible collocation information to the smart shopping cart for display in the display screen;
   receive, by the server, the image of the product placed into the shopping cart body captured by a camera; and
in response to receipt of the image of the product, identify a placement of the product in the shopping cart body through motion identification and detection, wherein the motion identification and detection comprises determining that a proportion of pixels have changes in gray values between adjacent frame images that exceed a threshold size.

9. The system according to claim 8, wherein the at least one computing device is further configured to receive an image of a user face, and identify the image of the user face to obtain the user identity information.

10. The system according to claim 8, wherein the at least one computing device is further configured to receive login information input on the smart shopping cart, and obtain the user identity information according to the login information.

11. A method, comprising:
providing a smart shopping cart comprising a shopping cart body and a display screen;
collecting, by the smart shopping cart, user information, transmitting the user information over a network to a server, and causing at least one user interface to be shown in the display screen;
receiving, by the server, the user information, identifying user identity information from the user information, querying a user consumption history database based on the user identity information to obtain user consumption history data, generating user consumption interest data according to the user consumption history data, generating product push information according to the user consumption interest data, and sending the product push information to the smart shopping cart for display on the display screen;

capturing, by a camera, an image of a product placed into the shopping cart body and transmit the image of the product to the server;

receiving, by the server, the image of the product and obtaining, by the server, food information of the product based on the image;

querying, by the server, an edible collocation information database according to the food information to obtain edible collocation information by:

combining foods placed in the shopping cart body in pairs, and querying, for each food combination pair, the edible collocation information database to identify that the food combination pair has a good health characteristic when eaten together; or querying the edible collocation information database to identify that the food combination pair should not be eaten together;

causing, by the server, the edible collocation information to be presented in the at least one user interface shown in the display screen, the edible collocation information comprising the food that is more nutritious than the product, or the food that should not be eaten together with the product;

causing, by the server, the display screen to transition between the at least one user interface comprising the product push information and the at least one user interface comprising the edible collocation information; and in response to receipt of the image of the product, identifying, by the server, a placement of the product in the shopping cart body through motion identification and detection, wherein the motion identification and detection comprises determining that a proportion of pixels have changes in gray values between adjacent frame images that exceed a threshold size.

12. The method according to claim 11, wherein the method further comprises collecting, by the smart shopping cart, the user information by capturing a facial image with the camera.

13. The method according to claim 12, further comprising:

identifying, by the server, a user of the smart shopping cart, through matching using the facial image;

sorting, by the server, products the user has purchased in an order from a high purchase frequency to a low purchase frequency according to the user consumption history data;

identifying, by the server, recommended products from the products with a purchase frequency higher than other ones of the products; and generating, by the server, the product push information such that the product push information comprises the recommended products and prices for the recommended products to be presented in promotion information.

14. The method according to claim 13, wherein:

the promotion information comprises a discount for a respective one of the recommended products; and the promotion information is generated such that a higher the purchase frequency of the respective one of the recommended products, the higher the discount given to the user.

15. The method according to claim 11, wherein the display screen is a touch screen, and the method further comprises collecting, by the smart shopping cart, the user information by obtaining the user information input through the touch screen.

16. The method according to claim 11, further comprising, in response to the placement of the product in the shopping cart body:

comparing, by the server, adjacent frame images captured by and received from the camera;

determining, by the server, a changed region in the image based on depth information;

extracting, by the server, the changed region as a candidate product region;

executing, by the server, a product identification model on the candidate product region as extracted to identify a type of the product placed into the shopping cart body; and obtaining, by the server, the food information of the product according to the product identification model, the product identification model being pre-trained using samples of various types of products.

17. The method according to claim 16, further comprising, in response to the type of the product being successfully identified, causing, by the server, the at least one user interface shown in the display screen to display the product placed into the shopping cart body, the at least one user interface comprising product information associated with the product.

18. The method according to claim 11, wherein the edible collocation information database comprises a plurality of products and a unique identifier associated with each of the plurality of products, the edible collocation information database further comprising a plurality of combinations of the products indicating whether or not a first subject of the products should be eaten with a second subset of the products.

* * * * *